United States Patent [19]
Fletcher et al.

[11] Patent Number: 4,520,266
[45] Date of Patent: May 28, 1985

[54] RADIATION LEVEL DETECTORS

[75] Inventors: Edwin Fletcher, Rotherham; Gerald V. Beaton; Charles R. Gomer, both of Sheffield, all of England

[73] Assignee: British Steel Corporation, London, England

[21] Appl. No.: 418,425

[22] Filed: Sep. 15, 1982

[30] Foreign Application Priority Data

Sep. 18, 1981 [GB] United Kingdom ............... 8128235
Feb. 19, 1982 [GB] United Kingdom ............... 8204956

[51] Int. Cl.$^3$ ............................................. G01F 23/00
[52] U.S. Cl. .................................................. 250/357.1
[58] Field of Search ....................... 250/357.1, 358.1; 73/293

[56] References Cited

U.S. PATENT DOCUMENTS 3,098,154 7/1963 Crump ............................. 250/357.1
3,717,760 2/1973 Martin ............................. 250/357.1

FOREIGN PATENT DOCUMENTS 1449846 9/1976 United Kingdom .
1468559 3/1977 United Kingdom .

Primary Examiner—Janice A. Howell
Attorney, Agent, or Firm—Bacon & Thomas

[57] ABSTRACT

The free surface of a fluid (e.g. molten steel) dense to particular ionizing radiations and contained within a vessel (e.g. a casting mould) is monitored by a device which includes a radio active source positioned on one side of the vessel and a detector positioned on the side which includes a photo-multiplier having a photo cathode coupled to a phosphor scintillator of sufficient length to cover the predicted range of movement of the liquid free surface.

9 Claims, 2 Drawing Figures

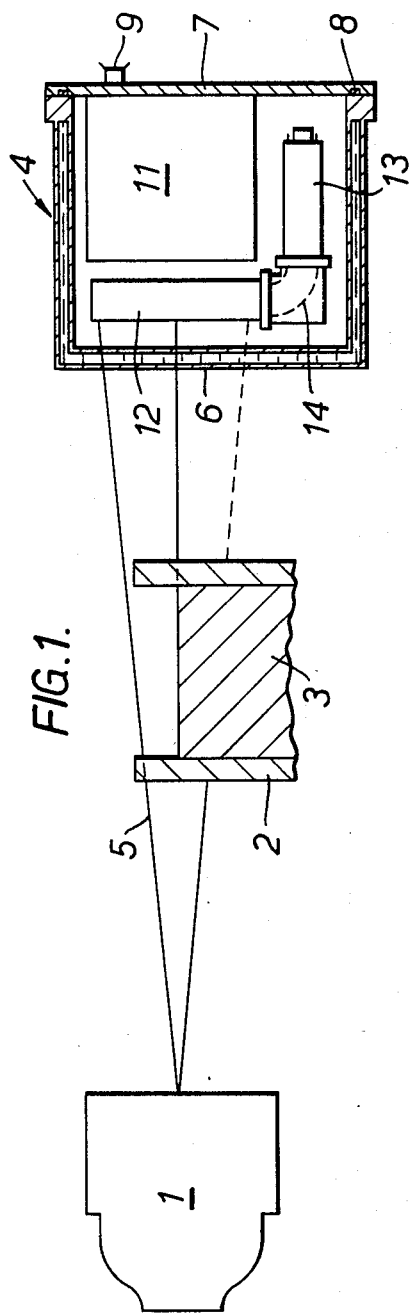
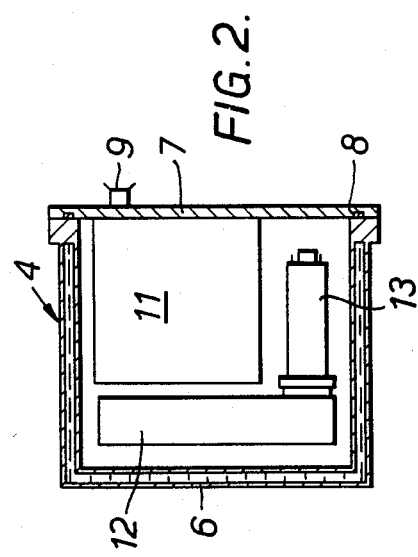

RADIATION LEVEL DETECTORS

This invention relates to monitoring the free surface of a contained fluid; more especially the invention concerns detection apparatus utilising gamma radiation of an energy quality which is attenuated by the fluid whose free surface is to be detected. One particular application of the invention is the detection of the free surface of liquid metal eg steel, contained in a water cooled copper mould of a continuous casting machine. Many similar applications are practicable. Thus, the fluid may comprise liquids other than liquid metal or a flowable pulverised or fragmented solid material or a granular material.

Hitherto, accurate measurement of the free surface position of liquid metal in a mould of a continuous casting plant has been beset with problems because of the harsh environment associated with the casting process and the difficulties in ensuring consistently correct operation of the measuring system in use.

Ionising radiation attenuation techniques have been proposed to detect liquid metal free surface; however in several instances the long term performance of the equipment on site has been unsatisfactory because of difficulties in maintaining the equipment in a proper working condition. One major factor has been the difficulty in maintaining high tension electrical connections external to the detection unit in an environment subject to heat and water exposure. The operation of modern high cost and hazardous processes such as continuous steel casting demands that the measuring equipment employed is reliable, tolerant of the process operational requirements, and provides an accurate and meaningful linear signal to automatic control equipment allied to the process. A further requirement of an ionising radiation method is to minimise the size of the source required and thus reduce external radiation and the consequent need for protective shielding for plant operators.

Disadvantages inherent in previously known ionising techniques result in either a non linear signal, a slow response time or require the use of a large radio-active source. One known technique employs a line source on one side of a container and a point detector on the other side; the detector signal accuracy is, however, dependent on the linearity of the source itself which is difficult to achieve in construction. Additionally the overall radiation geometry is not efficient thus often requiring a large radioactive source. A second known technique employs a point source in conjunction with a line detector where the length of the detector covers the measurement requirements for good subsequent control of the process. Geiger-Muller tubes or ionization chambers have been employed but these have a slow response time and a limited high count rate often resulting in the use of a large source. Another known technique utilises a series of relatively small scintillation crystals to span the required measurement range, the problem here being that the signal is only approximately linear there being signal transfer deviations between crystals. Also, several photo-multiplier tubes are necessary.

Alternatives to the foregoing ionising techniques have been used, but generally these are intolerant of particular operational requirements. For example, for continuous casting applications several of them demand direct access to the mould mouth and consequently restrict operational access in that region.

According to the present invention there is provided apparatus for monitoring the free surface position of a fluid dense to particular ionising radiations, within a container, comprising a detector head having a casing which houses a photo-multiplier whose photo cathode is coupled to a phosphor scintillator of sufficient length to span the range of fluid surface positions to be monitored, the apparatus being adapted to be located to one side of the container to receive ionising radiations from a compact radioactive source positioned on the other side of the container and the photo-multiplier being operable to provide electrical output signals proportional to the intensity of the radiation incident on the phosphor scintillator and the free surface position of the fluid within the container.

The phosphor scintillator may be of activated inorganic crystal or of plastic phosphor kind. Radiation intensity is suitably chosen, with regard to acceptable signal output noise band width and required liquid free surface position and output signal response time, by means of the strength of a compact (i.e. point) gamma radiation emitting radio-active source mounted adjacent to the most extreme liquid free surface position register required and on the opposite side of the container to the detector. The progressive geometrical obscuration of the phosphor scintillator by the changing liquid free surface position, causes a proportionate reduction in the photo-multiplier output. This output is further transformed to produce at the outlet terminal of the detector head a low tension electrical current. The casing also houses secondary electronic circuitry to transform low tension electrical power supplied through an inlet terminal of the detector head to produce extra high tension electrical power to power the photo-multiplier. The casing may be water cooled.

In one construction, the detector head comprises a rectangular, double-skinned steel casing which houses an "L" shaped assembly of scintillator and photo-multiplier, the electronic circuitry being in module form and positioned within the rectangular space bounded on two sides by the scintillator/photo-multiplier assembly. The photo-multiplier may be connected to the scintillator by means of a right angled light guide. Alternatively, the scintillator may be coupled directly to the photo-multiplier. In each case, the scintillator is of constant cross section in a rectangular or cylindrical form and may be of activated inorganic crystal or of plastic phosphor kind.

The steel casing may include a solid lid to which can be attached the scintillator, the photo-multiplier and the electronic module; preferably, the lid is sealed to the casing face by an integral "O" ring of, for example, neoprene rubber. Additionally, the inlet and outlet terminal connector spades may also be attached to the casing lid and coupled to the internal electronic circuitry via sealed connections.

The invention will now be described by way of example only with reference to the accompanying diagrammatic drawings in which:

FIG. 1 is a schematic side view, partly in section of apparatus in accordance with the invention as applied to a mould for the continuous casting of liquid metal; and FIG. 2 is a section taken through an alternative construction of a detector head in accordance with the invention.

The apparatus illustrated in FIG. 1 comprises a compact (ie point) radio-active source (1) positioned on one side of a continuous casting machine mould (2) containing a quantity of liquid metal (3) and a detector head (4) positioned one the opposite side of the mould (2). The radio-active source (1) includes a window through which a beam of (5) of gamma radiation can be directed towards the mould in the vicinity of the level of the liquid metal (3). Because only the liquid metal highly attenuates the gamma radiation, essentially that fraction of the gamma radiation beam not interrupted by the liquid metal is received by the detector head (4).

The detector head (4) comprises a rectangular, double-skinned steel casing (6) including a solid steel lid (7). Coolant (e.g. water) is conveyed to and from the casing (6) and flows continuously between the inner and outer skins thereof. The lid (7) is sealed to the casing face by an integral "O" ring (8) of, for example, neoprene rubber, and carries on its external face terminal connector spades (9) for conveying electrical current to and from the head (4).

Mounted on the internal face of the lid are an electronic module (11) and an "L" shaped assembly of a radiation-sensitive scintillator (12) and a photo-multiplier (13). The photo-multiplier may either be optically coupled to one end of the scintillator (12) through a right angled light guide (14), as illustrated in FIG. 1, or directly coupled to the scintillator, as illustrated in FIG. 2. The latter coupling may result in increased optical losses, but has the advantage of compactness. The scintillator (12) is preferably an activated inorganic crystal; alternatively, a plastic phosphor may be employed. An activated inorganic crystal has the advantage of giving efficient utilisation of the available radiation thus yielding benefits of low time constant with a relatively small source and an acceptable noise and width.

The assembly of the scintillator (12) and the photo-multiplier (13) need not necessarily be "L" shaped; thus, the assembly may be elongate.

The electronic module (11) includes a first electronic circuit connected to transform pulsed high-impedance electrical signals received from the photo-multiplier (13) to produce, at an outlet terminal of the detector head, a low tension electrical current which is linearly proportional to the level of radiation received by the scintillator (12). The module (11) further includes a second electronic circuit operable to transform low tension electrical power supplied to the detector head through an inlet terminal to produce the required extra high tension power to supply the photo-multiplier.

Operation of the illustrated apparatus will now be described. The mould (2) is supplied continuously with liquid metal from a tundish (not shown) and the apparatus operates to provide a continuous, accurate measurement of the level of the metal within the mould. As mentioned previously, a beam of gamma radiation emitted by the radio-active source is highly attenuated by the liquid metal, leaving only effectively that fraction above the liquid metal received by the scintillator (12) of the detector head (4) as a measure of the liquid metal level. The consequent illumination of the scintillator activates the photo-multiplier (13) to produce an equivalent pulsed, high-impedance electrical output which is transformed within the aforementioned first electronic circuit of the module (11) to produce, at an outlet terminal, a steady low tension electrical current which is linearly proportional to the photo-multiplier output and, consequently proportional to the distance of the liquid metal level from the top of the mould. Additionally, the aforementioned second circuit of the electronic module receives low tension power from an external source via an inlet terminal and transforms this into the extra high tension power required to supply the photo-multiplier (13).

It will be appreciated that the apparatus described above embodies a number of advantages consequent upon its compactness and the fact that signal processing and extra high tension generation are carried out internally within the detector head, thus making possible the use of only low tension external electrical connections which can more readily withstand hazards such as water sprays. From a systems design point of view, therefore, it can be regarded as a simple liquid free surface position detector and accordingly be used as a basic electrical transducer. Additionally, because of the electronic techniques used, the apparatus has a low inherent drift which enables its ensitivity to be pre-set so that, once installed, it need not be adjusted during normal operation.

Furthermore, collimation of the radiation output to just fill the highest deficiency detector for the particular radiation minimizes stray radiation fields thereby leading to increased safety in operation.

We claim:

1. Apparatus for monitoring the free surface position of a fluid present within a container which is dense to particular ionising radiations, comprising a detector head adapted to be located to one side of the container and to receive ionising radiations from a compact radio-active source positioned on the other side of the container, the detector head including a casing which houses a radiation sensitive phosphor scintillator of sufficient length to span the range of fluid surface positions to be monitored, a photo-multiplier optically coupled to the scintillator, and an electronic module connected to receive pulsed high-impedance electrical signals from the photo-multiplier proportional to the intensity of the radiation incident on the phosphor scintillator and to transform such signals to produce at an outlet terminal of the detector head low tension electrical current which is linearly proportional to the level of radiation received by the scintillator and representative of the free surface position of the fluid within the container.

2. Apparatus as claimed in claim 1 wherein the phosphor scintillator is of substantially constant length and wherein the photo-multiplier operates at a substantially constant voltage to provide electrical output signals which are essentially linear.

3. Apparatus as claimed in claim 1 wherein the phosphor scintillator comprises an activated inorganic crystal.

4. Apparatus as claimed in claim 1 wherein the electronic module includes an inlet terminal connected to receive low tension power input from an external source and is operable to transform such input to produce extra high tension power to drive the photo-multiplier.

5. Apparatus as claimed in claim 1 wherein the container comprises a continuous casting mould and the fluid is liquid metal.

6. Continuous casting plant including a mould positioned to receive cast liquid metal including apparatus as claimed in claim 1.

7. Apparatus as claimed in claim 1 wherein the detector head casing houses a substantially "L" shaped assembly of scintillator and photo-multiplier, the electronic module being positioned within the space bounded on two sides by the "L" shaped assembly.

8. Apparatus as claimed in claim 7 wherein the scintilator is coupled directly to the photo-multiplier.

9. Apparatus as claimed in claim 1, wherein the detector head comprises a doubleskinned casing adapted to receive a coolant between the inner and outer skins thereof.

* * * * *